S. CLIME.
Cultivator.
Patented Oct. 15, 1836.
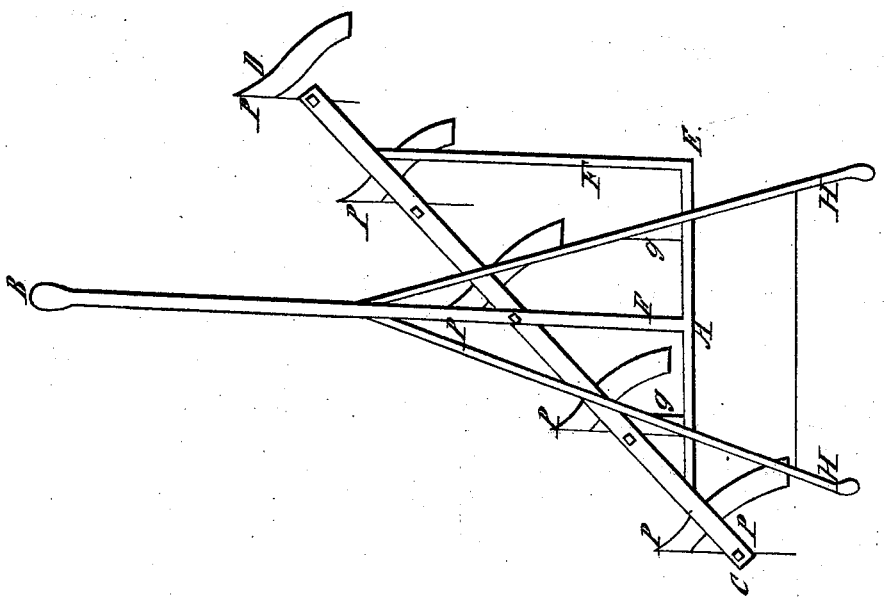

UNITED STATES PATENT OFFICE.

SAMUEL CLIME, OF BUCKS COUNTY, PENNSYLVANIA.

COMBINED PLOW, &c.

Specification of Letters Patent No. 53, dated October 15, 1836.

*To all whom it may concern:*

Be it known that I, SAMUEL CLIME, of Bucks county, Pennsylvania, have invented a combined plow, being a machine for plowing in light free soil, for plowing in grain, dressing Indian corn, and all other light work of similar kind.

The principle of combination on which the due construction of the machine depends is to place the line of draft, or beam so that the resistance to be overcome may bear equally on each side of that line. To effect this purpose the transverse beam or rest to which the several plows are attached is fastened to the beam precisely in the middle of the transverse beam, and having the center plow immediately under the point of intersection. The other plows are then placed equidistant on each side of the beam. This disposition brings the beam of the plow very nearly in the line of equal resistance, the middle plow becomes a center of motion, or fulcrum in which the whole machine balances, and adds greatly to the strength of the apparatus, and the firmness of its parts. The transverse beams cross the beam of the plow at an angle of forty five degrees thus placing the right hand plow as much before the next succeeding one as it is removed at a right angle on one side and thereby giving the greatest possible room, or space with the least length of beam. For the same reason the length of the sole of the plow should not much exceed its extreme breadth. The proportions used, and found convenient, are about ten inches in length by eight in breadth, and the turn of the mold board should be very little beyond a perpendicular from the hinder corner of the share.

The plows consist simply of a mould-board, landside, and sheath, or standard. The mold board is drawn, flattened out at the lower edge so as to supply the place of a share, or wing. These should all be of iron either hammered, and rolled, or cast at the pleasure of the maker, and fastened into the transverse beam by the standard with a shoulder on the under side of the beam fitted to an iron collar, or codrill, and a screw or nut or strong wedge on the top of the beam. The standards are made one foot in height, and the draft, or depth of the plow is given by elevating the forward end of the beam about one inch the whole length of the beam being five feet. The hinder end of the beam is fastened in a piece of timber crossing it at right angles horizontally, and meeting a similar piece of timber laid parallel with the beam, and both of them fastened in the transverse beam so as to brace the whole framework, and to form a rest for the stilts, or handles of the plow.

The machine is found to work well with plows of eight inches in breadth placed at the distance of fourteen inches from each other, thus cutting about ten inches each, and using five plows. Two horses are able to work this combined plow quite easily, and to pass over as much land in a day as three teams of two horses each with a common single plow.

To construct a combined plow, draw a right line A, B, for the beam about five feet in length. Draw another line C, D, for the transverse beam at an angle of forty five degrees with the former cutting at A, B, at a convenient distance from the hinder end, say fifteen inches, and carry C, D, with the right end forward to equal distances on each side of A, B, making the whole length of C, D, for five plows, say four feet eight inches, for three plows two feet four inches, and in proportion to the number, and size of the plows intended to be used allowances must be made in these measurements for the ends, and fastenings, the bracing and handles may be made of any form to please the maker, and combining strength with lightness of material. The transverse beam should be made of good white oak timber, not less than four inches deep, and having rivets well fastened passing horizontally through it at each end, or one inch at each side of each standard.

SAMUEL CLIME.

Witnesses:
WILLIAM B. REED,
WM. MICHAEL.